United States Patent [19]

Kinney et al.

[11] Patent Number: 4,907,623

[45] Date of Patent: Mar. 13, 1990

[54] HEAT-SHRINKABLE INSULATING TUBE

[75] Inventors: Douglas S. Kinney, Easton, Md.; Clark M. Kinney, Jr., Washington, D.C.

[73] Assignee: Plastics Tubes Company, Easton, Md.

[21] Appl. No.: 204,915

[22] Filed: Jun. 3, 1988

Related U.S. Application Data

[63] Continuation of Ser. No. 904,032, Sep. 5, 1986, abandoned.

[51] Int. Cl.⁴ ....................... B65D 59/06; H02G 15/02

[52] U.S. Cl. ..................................... 138/108; 138/103; 138/178; 174/DIG. 8

[58] Field of Search ................. 138/103, 99, 178, 137, 138/108; 174/87, 74 A, DIG. 8; 428/34.9

[56] References Cited

U.S. PATENT DOCUMENTS

| | | | |
|---|---|---|---|
| 1,749,207 | 3/1930 | Blair | 138/118 |
| 3,033,727 | 5/1962 | Cram et al. | 174/DIG. 8 |
| 3,037,529 | 6/1962 | Hancik | 174/DIG. 8 |
| 3,265,807 | 8/1966 | Smith | 174/DIG. 8 |
| 3,288,914 | 11/1966 | Fuller et al. | 174/DIG. 8 |
| 3,294,941 | 12/1966 | Mullen | 174/DIG. 8 |
| 3,507,977 | 4/1970 | Pusey | 174/DIG. 8 |
| 3,678,174 | 7/1972 | Ganzhorn | 174/DIG. 8 |
| 3,847,183 | 11/1974 | Meyer | 138/DIG. 8 |
| 3,957,382 | 5/1976 | Greuel, Jr. et al. | 174/DIG. 8 |
| 3,985,951 | 10/1976 | Harris | 174/DIG. 8 |
| 4,118,596 | 10/1978 | Bassett et al. | 174/DIG. 8 |
| 4,151,364 | 4/1979 | Ellis | 174/DIG. 8 |
| 4,356,046 | 10/1982 | Yamazaki et al. | 174/DIG. 8 |
| 4,431,469 | 2/1984 | Falcomato | 174/DIG. 8 |
| 4,467,002 | 8/1984 | Crofts | 138/178 |
| 4,595,724 | 6/1986 | Roblitz | 174/74 A |
| 4,721,832 | 1/1988 | Toy | 174/87 |
| 4,751,350 | 6/1988 | Eaton | 174/87 |

FOREIGN PATENT DOCUMENTS

| | | | |
|---|---|---|---|
| 2134678 | 8/1972 | France | 174/DIG. 8 |

OTHER PUBLICATIONS

"Heat Shrinkable Self-Sealing Tape", American Pamcor, Inc., Product Info. Bull. #api-L-79e, 2/70.

*Primary Examiner*—James E. Bryant, III

*Attorney, Agent, or Firm*—Mason, Fenwick & Lawrence

[57] ABSTRACT

An insulating tubular connector is formed of layers of heat shrinkable plastic with the inner layer having a plurality of inwardly extending retention tabs for physically engaging wires or the like over which the tube is fitted to mechanically retain said tube on the wires until permanent bonding can be effected by heat shrinkage of the tube of the connector.

10 Claims, 4 Drawing Sheets

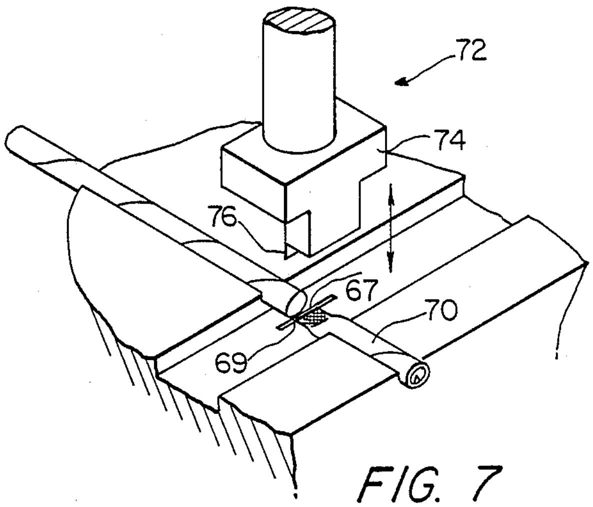
FIG. 7
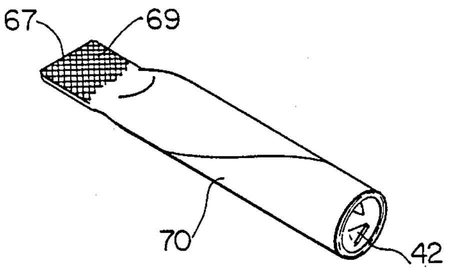
FIG. 8
FIG. 9A
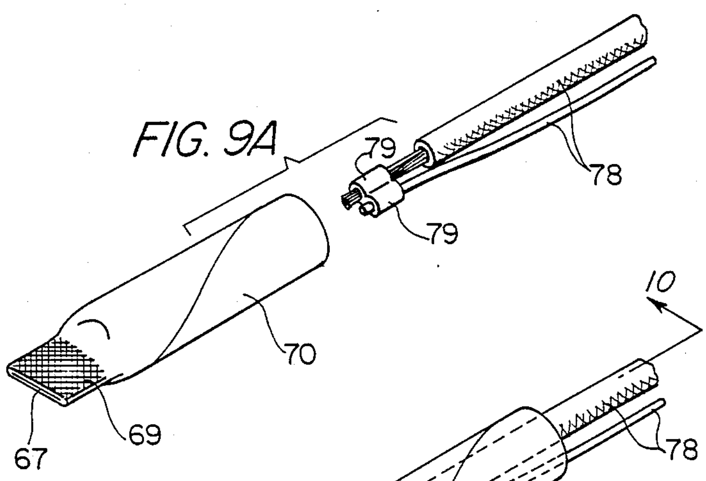
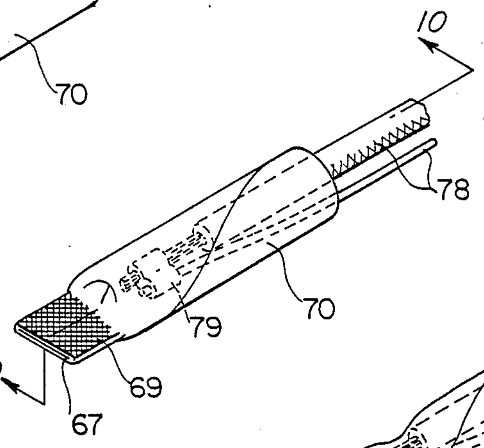
FIG. 9B
FIG. 9C
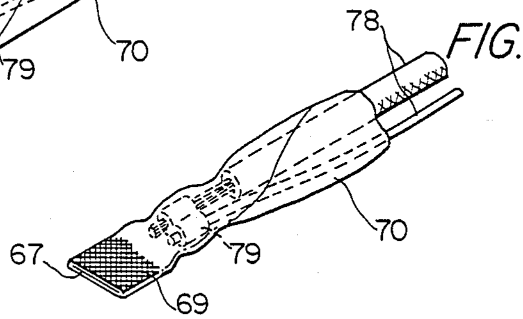
FIG. 11
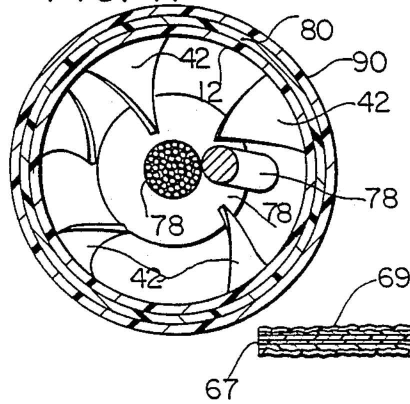
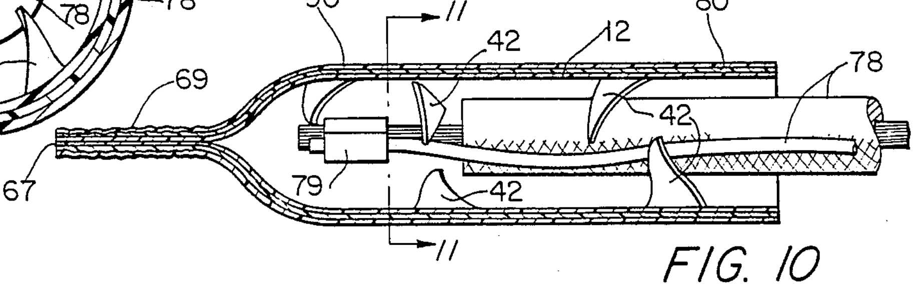
FIG. 10

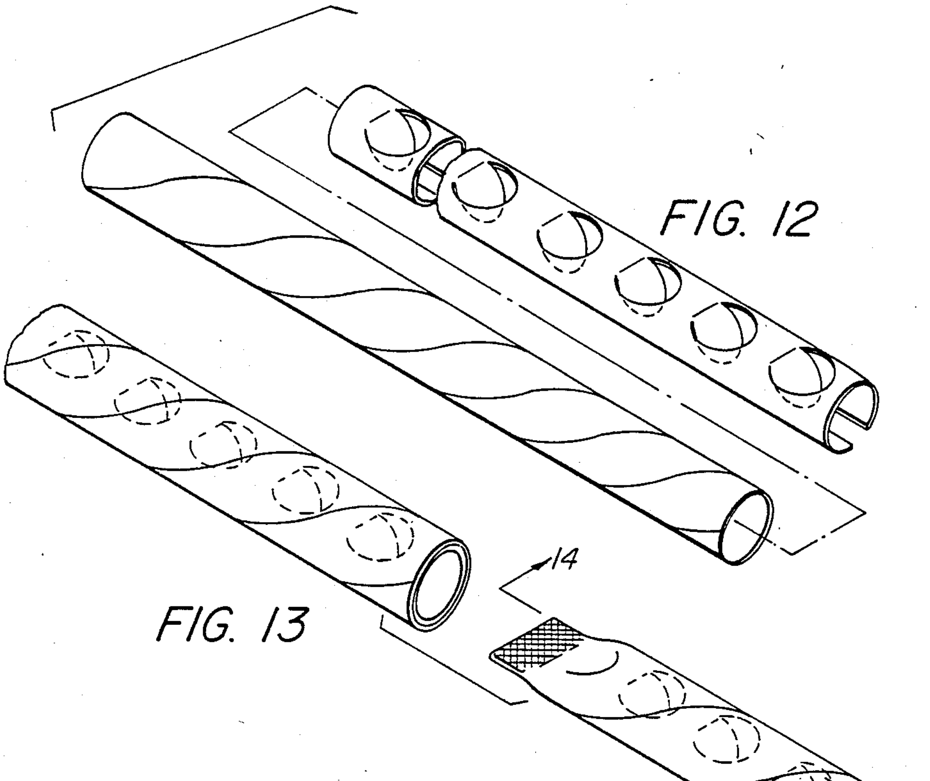
FIG. 12
FIG. 13
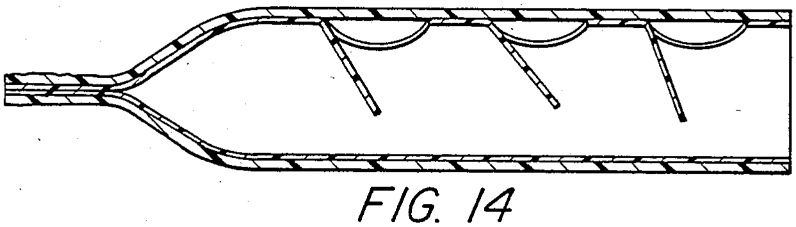
FIG. 14
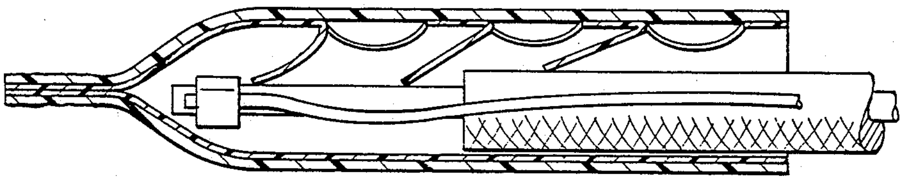
FIG. 15
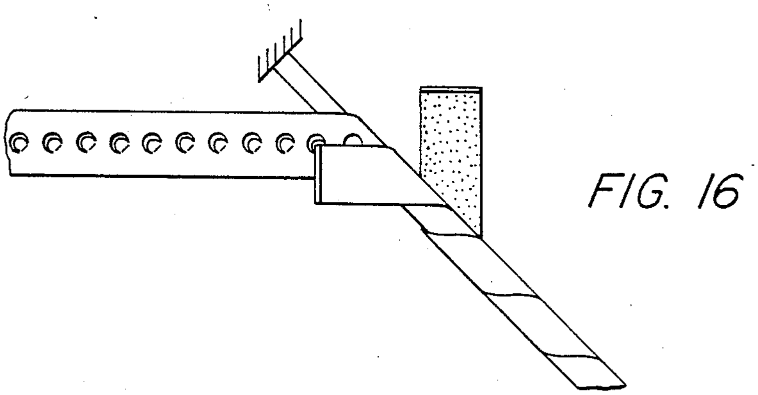
FIG. 16

HEAT-SHRINKABLE INSULATING TUBE

This application is a continuation of application Ser. No. 904,032, filed Sept. 5, 1986, now abandoned.

BACKGROUND OF THE INVENTION

1. Field of the Invention

This invention is directed to the field of electrical connectors and is more particularly directed to the field of laminated heat-shrinkable electrical connectors of the type employing tubular laminated mylar and the like connectors which are positioned over electrical conductors and then substantially heat-shrunk to provide a permanent bond.

Connectors of the aforementioned type are well known in the and are exemplified by U.S. Pat. No. Re. 30,817 which discloses a heat-shrinkable outer sheath of layer 12 provided with an interior layer 14. The layer 14 is self-adhesive and is adhesively secured to wires to be connected as shown in FIG. 2 of said patent for the purpose of maintaining the connector on the wires until the subsequent shrinkage of the outer tubular component by the application of heat. Since connectors of this type are frequently used on motors or the like which are mounted on a movable carrier or conveyor which subjects the motor to vibrations; there is a need for means for maintaining the connectors on the motors until they are permanently positioned by heat-shrinkage. The aforementioned reissue patent accomplishes the foregoing purpose by use of the adhesive layer on the interior of the sheath. Other patents incorporate fusable material on the interior of similar connectors such as for example in U.S. Pat. Nos. 3,243,211; 3,985,591; 3,986,253; and 3,582,457. However, the use of adhesive layers, fusable materials and the like as exemplified in the prior art adds substantially to the expense of the finished item. Additionally, the adhesive materials do not always adequately secure the connectors on the wires to be permanently bonded until such time as the permanent bonding can be effective. In other words, the connectors sometimes fall off the wires before permanent bonding can be effected.

Therefore, it is a primary object of the present invention to provide a new and improved heat shrinkable insulating electrical connector.

A further object of the present invention is the provision of new and improved insulating electrical connector employing mechanical retention means in the connector for holding the connector in position prior to its shrinkage and bonding of the connector to wires to be connected.

Yet another object of the present invention is a provision of a new and improved heat shrinkable insulating electrical connector which is more economical to manufacture and which provides reliable, mechanical retention of the connector in position prior to permanent bonding to wires or the like on which it is mounted.

A further object of the present invention is the provision of a new and improved method of making a heat-shrinkable insulating connector.

SUMMARY OF THE INVENTION

Achievement of the objects of the present invention is enabled through the provision of a heat-shrinkable electrical insulator having unique structural characteristics and which is formed by a uniquely novel method.

More specifically, a first embodiment of the present invention comprises an insulating connector consisting of an outer tube formed of a plurality of layers of heat-shrinkable MYLAR or the like. The interior of the heat-shrinkable tube includes a plurality of inwardly extending retention effecting tab members which are of triangular shape and are pointed at their outer ends.

The retention effecting tab members mechanically engage the wires over which the tubular connector is positioned and will hold the connector in position until such time as heat-shrinkage is effected for providing a permanent bonding of the connector to the wires. The triangular shaped pointed end retention tab members are unitarily formed of a portion of a mylar or the like ribbon of which the outer portions of the tube member are formed. Consequently, there is no additional material expense involved in the provision of the retention means, a substantial advantage over the prior art devices of the type employing adhesive or other similar retention means additional to and secured within the outer heat-shrinkable tube.

Fabrication of the first embodiment of the invention is effected by moving a first linear ribbon of mylar or the like through cutting means which provides a series of parallel cuts extending inwardly from each edge of the mylar ribbon and oriented at an angle of approximately 45° with respect to the edge of the ribbon. The cuts terminate approximately one third of the distance inward from each edge of the ribbon. The ribbon is then passed over a first fixed member in the form of a cylindrical rod about which the ribbon is bent for approximately 90° of contact with the outer surface of the rod. Consequently, the moving ribbon changes direction by 90° as it moves around the surface of the fixed rod. A second fixed member in the form of a square rod having a planar surface is positioned adjacent the cylindrical rod and has a lower corner edge spaced a small distance therefrom to provide a nip through which the moving ribbon passes as it leaves the cylindrical rod. The bending movement of the ribbon about the cylindrical rod causes the portions of the ribbon between the parallel cut lines to extend outwardly in the form of tab members extending away from the central axial portion of the ribbon during the movement of the ribbon around the cylindrical rod surface. The outwardly extending tab members engage the lower corner edge of the planar surface of the square rod as the ribbon is leaving the surface of the cylindrical rod so that the tab members are bent forcibly backwards about a fold line on the surface of the ribbon as the ribbon passes across the planar surface of the square rod. The ribbon then passes around a further cylindrical rod and is fed on to a rotating mandrel on which the ribbon is spirally wound in well-known manner. Additional ribbons of heat-shrinkable mylar are wound over the first ribbon to achieve a sleeve of desired thickness. The tab members are provided on the inner surface of the wound ribbon so that they rest on the outer surface of the mandrel and are flattened against adjacent inner surfaces of the remaining portions of the ribbon. The spirally wound ribbons are bonded to each other as they move on to the mandrel and the resultant tube or sleeve is subsequently cut into desired lengths following removal from the end of the mandrel. Upon removal of the tube from the mandrel, the tab members on the inside of the tube spring outwardly so that they are oriented to have a substantial component of position extending approximately 90° with respect to the inner surface of the laminated tube member.

After the tubular members are cut into insulating sleeves of desired length, one end of each sleeve is closed by heat bonding or the like and fabrication of the insulating member is therefore completed. In some instances, it might not be desirable to close one end of the insulating member and such closed end is not necessarily a part of the invention.

In a second embodiment of the invention a performed tube formed of heat shrinkable ribbon is cut to form a longitudinal slit parallel to the longitudinal axis of the tube. Truncated circular cuts are made down the center of the tube, a predetermined distance from the edges bounding the longitudinal to form semi-circular tab forming portions. The tube is formed in a conventional manner of a heat-shrinkable material such as MYLAR or Dupont T Film with a thickness of between approximately 3-5 mil. T Film will provide a better lock than MYLAR because of its superior memory. The tube is opened along the longitudinal slit and is fed through tab folding and forming device which folds the semi-circular tabs backward. The fold lines which are formed in the tube are perpendicular to the longitudinal axis of the tube. After the tab members have been formed, the tub is allowed to close, returning to its original cylindrical shape with the semi-circular tabs extending inwardly. The tube is then axially and matingly inserted into a second performed tube of similar cylindrical shape and dimensions to provide a composite tube which is passed over an anvil and a crimper sealer/cutter to provide an insulating connector having a sealed end.

A third, and preferred, embodiment of the invention and method of making same uses a heat-shrinkable ribbon fed from a supply roll, and provided with truncated circular cuts down the center a predetermined distance from its side edges to provide semi-circular tabs. The ribbon is then fed through a tab folding and forming device in the same manner as the ribbon of the first embodiment to provide fold lines defining one edge of each tab formed at an angle to the side edges substantially equal to the angle at which ribbon is fed onto a mandrel to provide a spiral, inner tubular layer over which additional heat-shrinkable outer cover are wound. The cover ribbon are bonded by adhesive on the outer surface of each other and the inner tubular layer as they are rolled onto the mandrel to provide a multi-ply tube having inwardly extending tabs formed by passing the tube over a brush and then cutting and bonding one end of the tube suctions in the manner of the first embodiment.

In use, the heat-shrinkable insulating members of the various embodiments are positioned over wires that are to be connected and the retention tabs, engage the wire members to mechanically hold the insulating members in position thereon. The insulating members are subsequently subjected to the application of heat which shrinks the insulating members into final position on their respective wire members.

BRIEF DESCRIPTION OF THE DRAWINGS

FIG. 7 is a perspective view illustrating the bonding and cutting of one end of tubular sleeves subsequent their formation;

FIG. 8 is a perspective view of a preferred embodiment of the invention as formed by the method steps of FIGS. 1 through 7;

FIG. 9-A illustrates a first step in the usage of the preferred embodiment for connecting and insulating a plurality of wires;

FIG. 9-B illustrates a second step in the use of the preferred embodiment;

FIG. 9-C illustrates a third step in the use of the preferred embodiment;

FIG. 10 is a sectional view taken along lines 10—10 of FIG. 9-B;

FIG. 11 is a sectional view taken along lines 11—11 of FIG. 10; and

FIG. 12 is an exploded perspective view of a second embodiment of the invention formed by a second method;

FIG. 13 is a perspective view of the embodiment illustrated in FIG. 12, with the tubular sleeve assembled and an end cut and bonded;

FIG. 14 is a sectional view taken along lines 14—14 of FIG. 13;

FIG. 15 illustrates a step in the usage of the embodiment of FIG. 14 for connecting and insulating a plurality of wires; and FIG. 16 is a plan view illustrating the preferred method of forming a third embodiment of the invention.

DESCRIPTION OF THE PREFERRED EMBODIMENT

Figure 1:
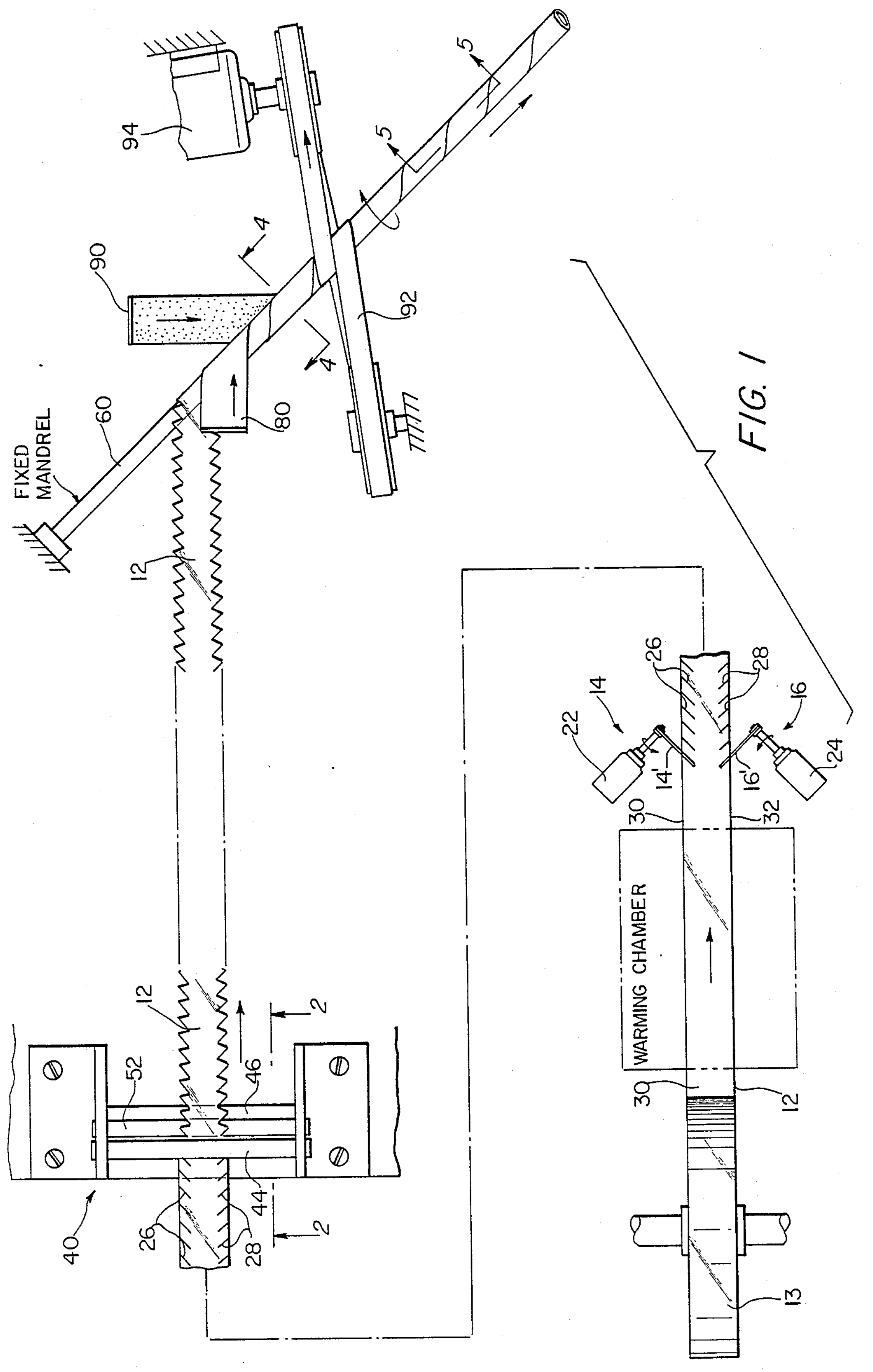
FIG. 1 is a plan view illustrating the preferred method of forming the preferred embodiment of the invention.

Referring to FIG. 1, fabrication of the preferred embodiment is effected through a preferred method in which a first ribbon 12 is fed from a supply roll 13; the ribbon is formed of heat-shrinkable ribbon formed of material such as polyethylene terephthalate, which is sold under the trademark MYLAR. The blank ribbon 12 is fed through a warming chamber by conventional means and is then fed past first and second side edge cutter means 14 and 16 which include blade means 14′ and 16′ respectively driven by synchronous drive means 22 and 24 in the form of motors or the like. The cutter blades 14′ and 16′ provide inwardly extending cut lines 26 and 28 which are canted backwardly with respect to the direction of movement of ribbon 12 at an angle of approximately 45° from the side edges 30 and 32 of the ribbon from which they extend inwardly. It should be noted that the cut lines extend inwardly approximately 25% of the width of the ribbon. It should also be observed that the ribbon includes side edges 30 and first and second surfaces 34 and 36 (FIG. 2) respectively. As an alternative, the ribbon 12 could be provided in precut form on a roll and cutter means 14, 16 could be eliminated.

Figure 2:
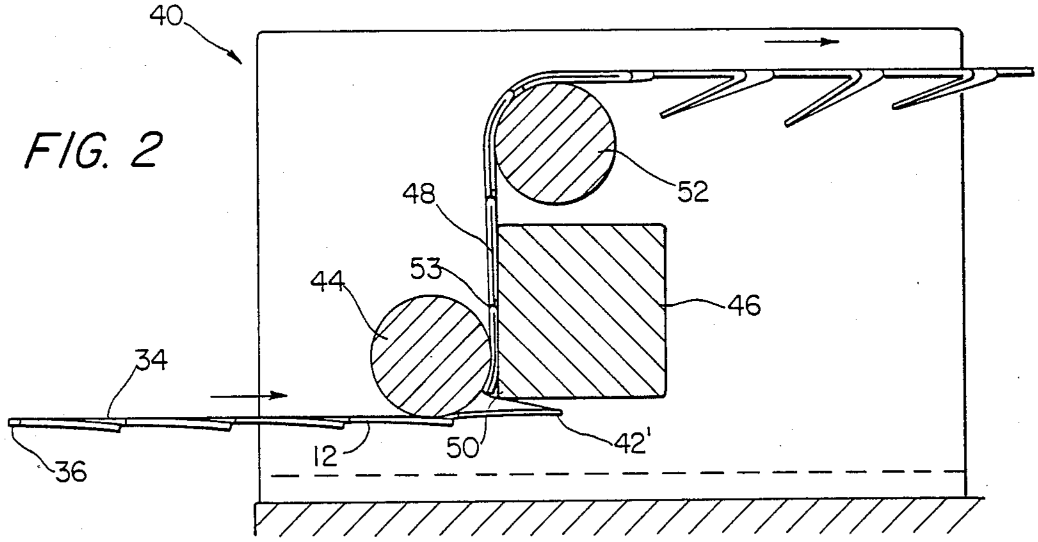
FIG. 2 is a sectional view taken along lines 2—2 of FIG. 1.
Figure 3:
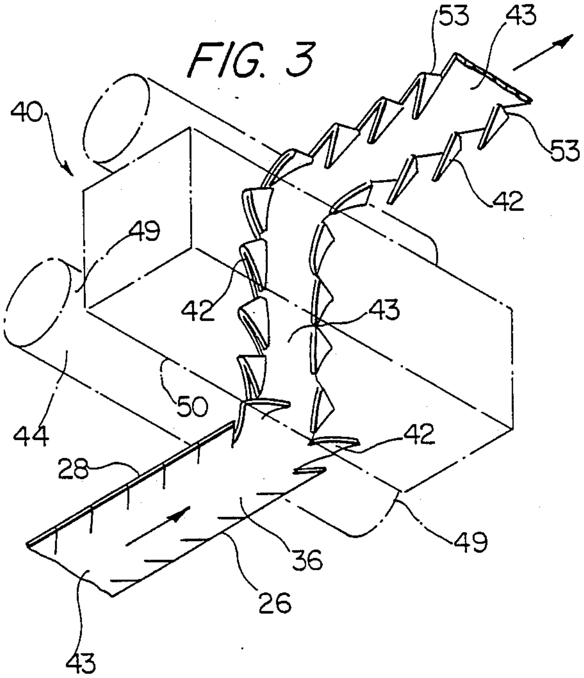
FIG. 3 is a bottom perspective view illustrating a manipulative step applied to the heat-shrinkable ribbon during fabrication of the preferred embodiment.
Figure 4:
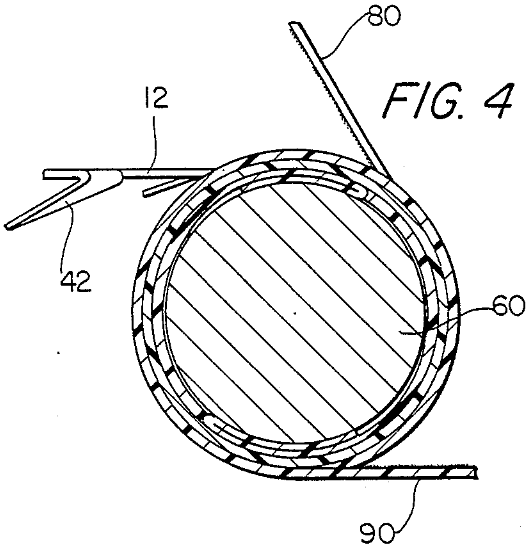
FIG. 4 is a sectional view taken along lines 4—4 of FIG. 1.

After leaving the cutting means 14, 16 then ribbon moves to a tab forming and folding device 40 which operates in a manner best illustrated in FIGS. 2 and 3 to fold tab forming portions 42 away from the remaining central portion 43 of the ribbon member so that the tab forming portions 42 are oriented to have a substantial position constituent at approximately 90° with respect to the remaining central ribbon portion. More specifically, the tab forming and folding device 40 comprises a fixedly positioned cylindrical rod 44, a tab folder member 46 of quadrilateral cross-section having a planar front surface 48 having a lower corner edge 50 spaced from the surface of cylindrical rod 44 to define a small nip 49 between rod 44 and corner edge 50. Additionally, an upper cylindrical guide rod 52 is positioned above the tab member 46 as best shown in FIG. 2.

In operation, the tab forming and folding device 40 receives the moving ribbon so that surface 34 contacts cylindrical rod 44 and the ribbon is wrapped about approximately 90° of the periphery of the cylindrical rod 44. The wrapping of the ribbon 12 about the rod 44 serves to bend the ribbon so that the tab forming portions 42 extend outwardly in the manner of tab 42' in FIG. 2 and are then bent about fold lines 53 as shown in FIG. 2. The ribbon passes through nip 49 and the protruding tab members 42 engage the lower edge 50 of planar surface 48 and are bent back around fold lines 53 against the surface 36 as they traverse the planar surface 48. This backward bending movement of the tab members serves to create a permanent bend line along line 53 so that the tab members will tend to extend outwardly from surface 36 after they clear planar surface 48 and cylindrical guide rod 52.

Figure 6:
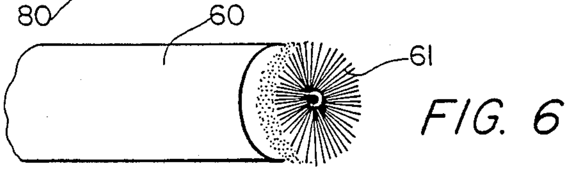
FIG. 6 is a perspective view of the end of the mandrel on which the heat-shrinkable ribbon is wound.

The ribbon leaves upper cylindrical guide rod 52 from which it moves onto a fixed mandrel 60 onto which it moves at a canted arcuate angle to provide a spiral layer of the ribbon on the surface of mandrel 60. Additional ribbons 80 and 90 are wrapped over ribbon 12 on mandrel 60 as shown in FIG. 1 and the three ribbons are bonded by adhesive on the inner surfaces of ribbons 80 and 90 as they are rolled onto the mandrel. The end 61 of the mandrel comprises a brush having radial bristles as shown in FIG. 6. Brush 61 orients the tabs 42 so that they have a substantial positional component perpendicular to the inner surface of tube.

Figure 5:
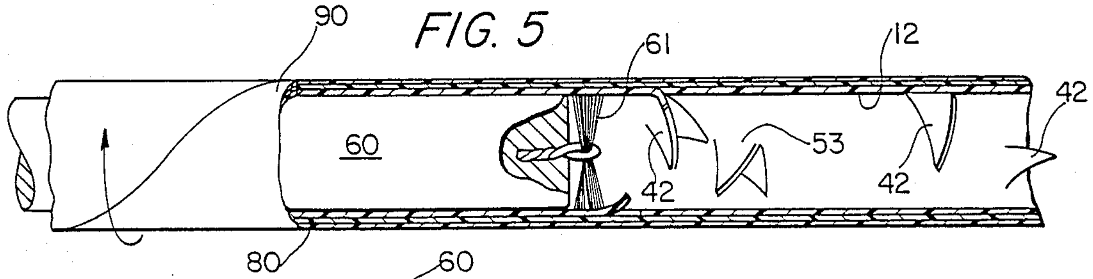
FIG. 5 is a sectional views taken along lines 5—5 of FIG. 1.

The spiral arrangement of ribbons 12, 80 and 90 on mandrel 60 is rotated by a friction belt 92 which is looped about the spiral ribbon arrangement and driven by a motor 94 as shown in FIG. 1. The resultant tubular construction 66 which is fed off the end 61 of the mandrel 60. After removal of the tube 61 from the mandrel the tab members extend inwardly of the tube as shown in FIG. 5 and remain oriented to extend inwardly of the tube as shown. The completed uncut tube 61 passes over an anvil 68, a crimper sealer/cutter 72 which includes a reciprocating ultrasonic sealing/cutting head 74 including a blade 76 which seals one end in area 69 and cuts the tube along line 67 in conventional manner to provide a resultant insulating connector 70 as shown in FIG. 8.

In use, the insulating connector means 70 is easily positioned (See FIG. 9-B) over wires 78 having clip means 79 to be connected. After the tab members mechanically engage the wire members to hold the insulating conductor in position as shown in FIG. 10 until such time as heat can be applied to the tube for effect shrinkage of the connector in a well known manner to result in a permanent bonding of the connector to the wires as shown in FIG. 9-C.

A second embodiment of the invention is illustrated in FIGS. 12–15 employs a preformed tube 100 formed of heat shrinkable ribbon cut down the side to form a slit 102 parallel to the longitudinal axis of tube 100. By any conventional means, truncaled circular cuts 104 are made down the center of the tube, a predetermined distance from the exges 106 and 108 bounding slit 102. Cuts 104 define tab forming portions 110.

Preferably, tube 100 is formed in conventional manner of a heat-shrinkable material such as MYLAR or Dupont T Film with a thickness of between approximately 305 mil. T Film will provide a better lock than MYLAR because of its superior memory.

Tube 100 is opened at slit 102 and is fed through the tab folding and forming device 40 illustrated in FIGS. 2 and 3.

In operation, the tab forming and folding device 40 receives the moving tube 100 so that outer surface 113 contacts cylindrical rod 44 and the ribbon is wrapped about approximately 90° of the periphery of the cylindrical rod 44. The wrapping of the open tube 100 about the rod 44 serves to bend the tube 100 so that the tab members 110 extend outwardly from inner surface 114 and are then bent about fold lines 116. The tab members 110 which are thus formed are substantially circular in shape. The opened tube 110 passes through nip 49 and the protruding tab members 110 engage the lower edge 50 of the planar surface 48 and are bent back around fold lines 116 against the surface 36 as they traverse the planar surface 48. This backward bending movement of the tab members serves to create a permanent bend line along line 116 so that the tab members will tend to extend outwardly from inner surface 114 after they clear planar surface 48 and cylindrical guide rod 52. As can be seen in FIGS. 12 and 13, the fold lines 114 which are formed in tube 100 are perpendicular to the longitudinal axis of the tube 100. Preferably, tab members 110 have a maximum width approximately ¾ of the inner diameter of tube 100.

Once tab members 110 have been formed, tube 100 is allowed to close, returning to its original cylindrical shape. Tube 100 is then inserted into a second preformed tube 118 of similar cylindrical shape and dimensions, and the completed uncut tube 120 passes over an anvil 68 and a crimper sealer/cutter 72 as described with respect to the first embodiment to provide an insulating connector 122 having a sealed end 124. Tube 118 is formed in conventional manner of heat-shrinkable ribbon such as MYLAR. Connector 122 is positioned and heat-shrunk over wires 78 and clip means 79 in the same manner as connector means 70.

A third embodiment of the invention and the preferred method of making same is illustrated in FIG. 16. A heat-shrinkable ribbon 130 is fed from a supply roll, and by conventional means is provided with truncated circular cuts 132 down the center a predetermined distance from side edges 134 and 136. Preferably, ribbon 130 is 3–5 mil thick and is formed from the same material as tube 100.

Ribbon 130 is then fed through tab folding and forming device 40 in the same manner as ribbon 12 to form substantially circular tab members 138. It then moves onto fixed mandrel 60 to provide a spiral layer over which additional ribbon 140 and 142 are wound, as described with respect to ribbons 12 80 and 90. It would be noted that the fold lines 144 are formed in ribbon 130 at an angle to side edges 134 and 136, and as shown in FIG. 16, this angle should be substantially equal to the angle at which ribbon 130 is fed onto mandrel 60.

Ribbons 130, 140, and 142 are bonded by adhesive on the inner surfaces of ribbons 140 and 142 as they are rolled onto the mandrel. Tab members 138 are oriented inwardly with respect to the inner surface of the tube thus formed by brush 61 and the remaining steps are the same as those previously described with respect to tube 61.

Thus, it will be seen that the present invention provides a heat-shrinkable insulating connector which is economical to construct and which provides for a surer positioning and retention of the connector on wires to be joined prior to the actual heat-shrinkage of the connector. While several embodiments have been disclosed, it should be understood that the spirit and scope of the invention should not be limited to the disclosed embodiments. For example, the connector could be a tubular member with both ends being open. Additionally, the tubular members different cross-sectioned shape as a consequence of having been wound on a mandrel having such different cross-sectional shaper. Additionally, in some instances it would be possible to eliminate the usage of the upper cylindrical guide rod 52 in forming the connector or the rod could be incorporated unitarily into the tab folder member 46 such as by providing a half-cylinder shaped upward protrusion from member 46. Various other conventional equipment and procedures known to those of skill in the art could be used for wrapping the ribbons on the mandrel, cutting the tubes and bonding the tube ends. Similarly, the number of ribbons used in forming the laminated tube can vary in accordance with the size and anticipated specific usage of the connector being formed. These and other modifications would not depart from the scope of the invention and it should therefore be understood that the scope of the invention is limited solely by the following claims.

We claim:

1. An insulating connector comprising:

a. a heat shrinkable tube comprising a spiral laminate formed of plural ribbons of heat recoverable plastic material, said tube having an inner surface; and b. said tube including a plurality of tab members formed of portions of said spiral laminate bent inwardly from remaining portions of said spiral laminate and extending unitarily inwardly from said inner surface of said tube for physically engaging wires or the like over which said tube can be fitted to mechanically retain said tube thereon until permanent retention thereon can be effected by subsequent heat shrinkage of said tube over such wires or the like.

2. An insulating connector comprising:

a. a heat shrinkable tube comprising a spiral laminate formed of a plurality of plastic ribbons formed of heat recoverable material, said tube having an inner surface and a cylindrical shape; and b. said tube including a plurality of tab members formed of portions of said spiral laminate bent inwardly from remaining portions of said spiral laminate and extending unitarily inwardly from said inner surface of said tube for physically engaging wires or the like over which said tube can be fitted to mechanically retain said tube thereon until permanent retention thereon can be effected by subsequent heat shrinkage of said tube over which such wires or the like.

3. An insulating connector comprising:

a. a heat shrinkable tube comprising a spiral laminate formed of heat recoverable plastic material, said tube having an inner surface; and b. said tube including a plurality of tab members having a pointed inner end, said tab members being formed of portions of said spiral laminate bent inwardly from remaining portions of said spiral laminate and extending unitarily inwardly from said inner surface of said tube for physically engaging wires or the like over which said tube can be fitted to mechanically retain said tube thereon until permanent retention thereon can be effected by subsequent heat shrinkage of said tube over such wires or the like.

4. An insulating connector as recited in claim 3, wherein said tab members are of triangular configuration.

5. An insulating connector comprising:

a. a heat shrinkable tube comprising a spiral laminate formed of heat recoverable plastic material, said tube having an inner surface; and b. said tube including a plurality of tab members having a curved inner end, said tab members being formed of portions of said spiral laminate bent inwardly from remaining portions of said spiral laminate and extending unitarily inwardly from said inner surface of said tube for physically engaging wires or the like over which said tube can be fitted to mechanically retain said tube thereon until permanent retention thereon can be effected by subsequent heat shrinkage of said tube over such wires or the like.

6. An insulating connector as recited in claim 5, wherein said tab members are of substantially circular configuration.

7. An insulating connector comprising:

A. a tube formed of heat-shrinkable material and comprising a spiral laminate formed of a plurality of plastic ribbons, one end of said tube being closed; and B. said tube including a plurality of tab members formed of a portion of said spiral laminate bent inwardly from remaining portions of said spiral laminate for physically engaging wires or the like over which said tube can be fitted to mechanically retain said tube thereon until permanent retention over such wires or the like.

8. An insulating connector as recited in claim 7, wherein said inwardly extending retention members comprise tab members having a pointed inner end.

9. An insulating connector as recited in claim 8, wherein said inwardly extending retention members comprise tab members formed of a portion of an inner ribbon layer of said spiral laminate, said tab members being bent inwardly from remaining portions of said inner ribbon layer and further including an outwardly positioned ribbon layer overlying said inner ribbon layer.

10. An insulating connector as recited in claim 7, wherein said inwardly extending retention members comprise tab members having a curved inner end.

* * * * *